United States Patent [19]
Tyler et al.

[11] 3,937,439
[45] Feb. 10, 1976

[54] THERMALLY OPERATED VALVE UTILIZING GAS ADSORBENT MATERIAL

[75] Inventors: Hugh J. Tyler; Denis G. Wolfe, both of Santa Ana, Calif.

[73] Assignee: Robertshaw Controls Company, Richmond, Va.

[22] Filed: Nov. 14, 1973

[21] Appl. No.: 415,882

[52] U.S. Cl. ............... 251/11; 73/368.2; 73/368.3; 137/79; 251/75; 252/421
[51] Int. Cl.² ............... F16K 31/165; F16K 17/38; G01K 5/32
[58] Field of Search ......... 73/368.2, 368.3; 137/79; 251/11, 75; 267/159, 161; 252/421

[56] References Cited
UNITED STATES PATENTS

| | | | |
|---|---|---|---|
| 2,271,307 | 1/1942 | Ray | 73/368.2 X |
| 2,387,792 | 10/1945 | Holmes | 73/368.3 X |
| 3,405,999 | 10/1968 | Riehl | 431/42 |
| 3,410,141 | 11/1968 | Zurstadt | 73/368.2 |
| 3,559,945 | 2/1971 | Coiner et al. | 251/75 X |
| 3,766,783 | 10/1973 | Tortoso | 73/368.2 |
| 3,843,308 | 10/1974 | Graham et al. | 73/368.2 X |

OTHER PUBLICATIONS

Dacey, J. R. et al., *Adsorbtion on Saran Charcoal,* In *Trans. Faraday Soc.,* Vol. 50, pp. 740–748 (1954).
Adams, L. B. et al. *Adsorbtion of Organic Vapors by Saran–Carbon Fibres and Powders,* In *Carbon* (1970), Vol. 8, pp. 761–772.

*Primary Examiner*—Donald O. Woodiel
*Assistant Examiner*—Frederick Shoon
*Attorney, Agent, or Firm*—Anthony A. O'Brien

[57] ABSTRACT

A thermally operated valve utilizes a member which is moved in accordance with the pressure of a gas within a chamber containing an adsorbent carbon material formed from a compound of carbon and a non-carbon component wherein the non-carbon component has been removed leaving a porous structure with cavities of sufficient size to receive and adsorb the gas.

16 Claims, 3 Drawing Figures

THERMALLY OPERATED VALVE UTILIZING GAS ADSORBENT MATERIAL

BACKGROUND OF THE INVENTION

1. Field of the Invention

The application relates to thermally operated valves and in particular, to valves utilizing temperature expansion of a gas to move a valve closing member.

2. Description of the Prior Art

The prior art, as exemplified by U.S. Pat. No. 2,627,911, No. 2,787,130 and No. 3,405,999, contains many thermally operated valves including valves utilizing gas charges with adsorbent activated carbon materials, such as activated charcoal, for operating valve closing members. Attempts to manufacture such activated adsorbent material containing valves in quantity have generally met with failure; activated carbon materials generally do not produce sufficient increase in volume or pressure change per degree change in temperature to warrant the added cost of the carbon materials; and different batches of activated materials exhibit widely varying adsorbent properties which make reliable manufacture of valves to be operated at a predetermined temperature impractical. Some valves require a significant degree of movement of a valve closing member to operate properly, particularly flame responsive valves in gas fired appliances and only liquid-vapor actuators, such as mercury actuators, could produce the amount of pressure or volume change per degree of temperature change necessary to produce sufficient valve member movement; however, such liquid vapor valves are limited to operation at temperatures near the boiling point of the liquid.

Also, the prior art, as exemplified in U.S. Pat. No. 1,744,735, No. 3,258,363; No. 3,442,819; No. 3,516,791 and publication (USSR Academy of Science, M. M. Dubinin, "Thermal Treatment and Microporous Structure of Carbonaceous Adsorbents" *Proceedings of the Fifth Conference on Carbon*, Volume 1, 1962, pages 81–87), contains many adsorbent carbon materials including decomposed polyvinylidene chloride and polyvinylidene fluoride. Adsorbent carbon materials are widely used in removing contaminants, or the like, from gases or liquids. Polyvinylidene chloride and polyvinylidene fluoride, in particular, have been recognized for their "molecular sieve" property, that is, their ability to adsorb certain gaseous materials which have small molecular sizes while being incapable of adsorbing other gaseous materials which have larger molecular sizes.

SUMMARY OF THE INVENTION

The invention is summarized in that a thermally operated valve includes a valve seat, a valve member for closing and opening the valve seat, means forming an enclosed chamber, an adsorbent carbonaceous material in the chamber, a charge of gas in the chamber, means responsive to the pressure of the gas in the chamber for moving the valve member relative to the valve seat, and said adsorbent carbonaceous material being a decomposed compound of carbon and a non-carbon component wherein the non-carbon component has been removed leaving a porous structure with cavities of sufficient size to receive and adsorb the gas.

An object of the invention is to construct a valve which can be reliably manufactured in quantities to operate at a selected temperature within a wide range of temperatures.

Another object of the invention is to replace valves utilizing mercury vapor pressure for operating a valve member.

It is also an object of the invention to construct a valve which is responsive to a flame at a temperature above present flame operated valves.

An additional feature of the invention is the provision of a spring means biasing a valve moving member against the gas operating pressure such that the valve member has substantially all of its movement within a narrow range of temperatures.

Other objects, features and advantages of the invention will be apparent from the following description taken in conjunction with the accompanying drawings.

DESCRIPTION OF THE PREFERRED EMBODIMENT

Figure 1:
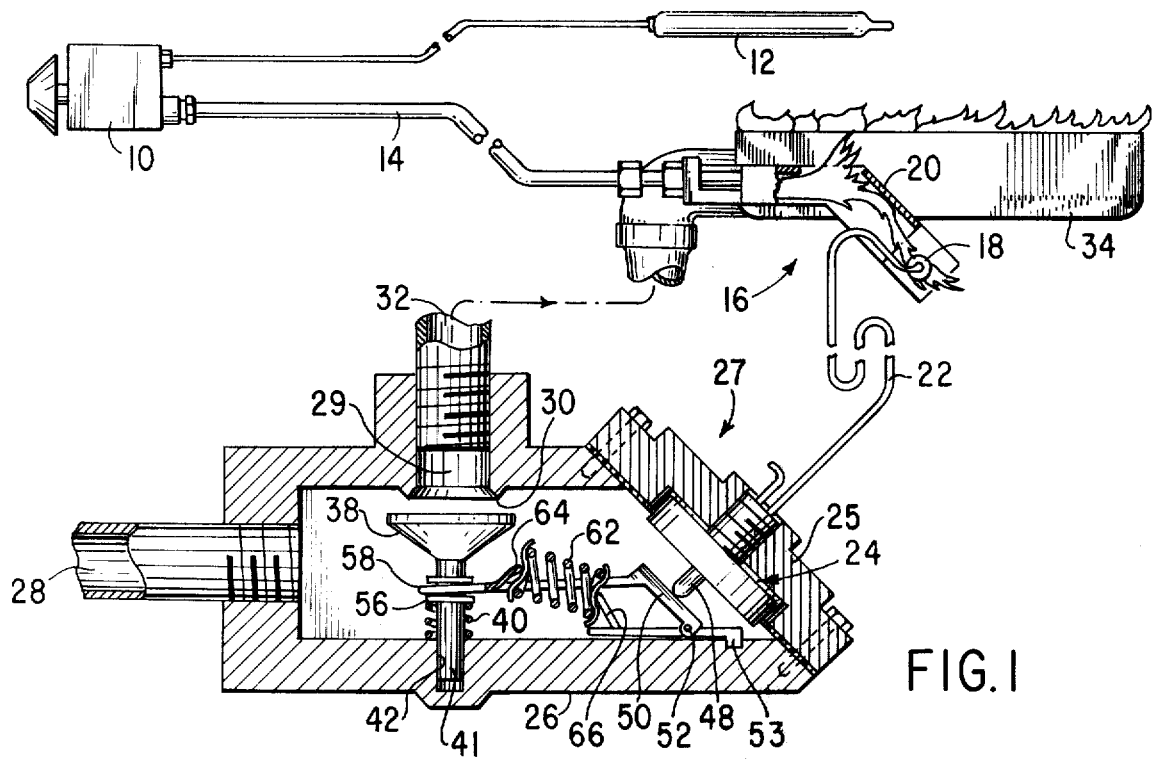
FIG. 1 is a diagram of a burner system with a cross section view of a flame valve in an open position in accordance with the invention.

As illustrated in FIG. 1, the invention is embodied in an oven burner system including a plural flow rate thermostat control device 10 which is operated by a temperature sensor 12 and interposed between a source (not shown) of gaseous fuel and a conduit 14 to a plural rate pilot burner indicated generally at 16. The control device 10 is any valve, such as is described in U.S. Pat. No. 3,405,999, which selectively supplies, in response to the sensor 12, a high rate flow of fuel and a low rate flow of fuel to the conduit 14. A flame sensing bulb 18 is mounted on the pilot burner 16 in the path of a portion of the high rate flame which is deflected by an angularly disposed deflector 20. The flame sensing bulb 18 is connected through a capillary or tube 22 to a valve actuator member, indicated generally at 24, mounted within a plate portion 25 of a housing 26 of a flame valve indicated generally at 27.

The valve 27 has an inlet 28, an outlet 29 and a valve seat 30 communicating between the inlet 28 and the outlet 29. The outlet 29 communicates through a conduit 22 to a main burner 34. A valve member 38 is biased upward by a compression spring 40 surrounding a valve stem 41 which is slidably mounted within a recess 42 in the housing 26. A plunger 48 extending from the valve actuator 24 engages a lever 50 having one end pivotally mounted at pivot point 52 on a support member 53 in the housing 26. The other end of the lever 50 is bifurcated and extends between flanges 56 and 58 mounted on the valve stem 41 of the valve member 38. A compression spring 62 extends between an extending tab 64 on the lever 50 and a tab 66 on the support member 53 such that it applies less upward force on the lever 50 when in the lower position, FIG. 1, than in the up position, FIG. 2.

Figure 3:
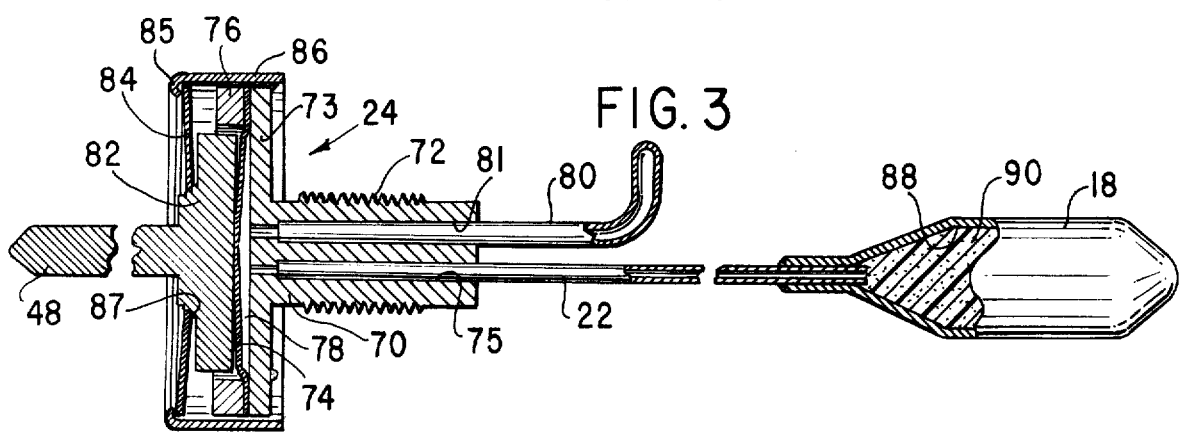
FIG. 3 is a cross section view of a valve actuator in the system shown in FIGS. 1 and 2.

The actuator 24, as shown in FIG. 3 has a support member 70 with a threaded portion 72 and a flange portion 73 through which a bore 75 extends. A flexible metal diaphragm 74, such as a 0.127 millimeter (0.005 inch) thick sheet of 301 stainless steel, is secured by suitable means, such as a spacer 76 and a seam weld, to the periphery of a flat face of the flange portion 73 of the support 70 to form a chamber 78 which communicates with the tube 22 suitably secured in the bore 75. A charging tube 80 is secured in a bore 81 of the support member 70 communicating into the chamber 78. The plunger 48 has a head portion 82 which is biased by nonlinear spring means, such as a washer-like or nearly-flat frusto-conical spring 84, known as a Belleville spring. The outer periphery of the spring 84 is held by an annular retainer 86 suitably secured to the flange portion 73 of the support member 22 such as by welding. The left side, as viewed in FIG. 3, of the outer periphery of the spring 84 is engaged by a lip 85 of the retainer 86. The right side of the inner periphery surrounding an opening through which the plunger 48 extends engages a shoulder 87 of the plunger 48. The spring 84 is formed from a suitable metal having elastic or spring properties within the range of operation and has an apex which extends to the right, as viewed in FIG. 3.

As used herein, the term "spring rate" or "force differential coefficient" refers to the incremental amount of additional force required to produce an additional incremental deflection per such incremental deflection of a spring. For a linear spring where the deflection is equal to the applied force times a constant, the force differential coefficient is equal to the constant throughout the range of operation of the spring.

The spring 84 has a force per deflection which is non-linear, wherein a portion of its range of deflection has a low spring rate or a force differential coefficient which is substantially less than that of a linear spring. The retainer 86 is positioned on the support member 70 such as to set the operational range of the spring 84 into the portion of its range of deflection where the spring 84 has a low spring rate or force differential coefficient which is substantially less than that of a linear spring throughout the range of movement of the plunger 48.

The bulb 18 and tube 22 are made from a suitable high temperature or flame resistance metal, such as stainless steel 304, Incoloy 800 and the like, to withstand a flame without building up desposits of unburned fuel. The bulb 14 forms a chamber 88 containing a porous carbonaceous material 90 which has gas adsorbent properties. The chambers 90 and 78, and the tubes 12 and 40 contain a charge or quantity of gas, such as a noble or monatomic gas selected from helium, neon, argon, krypton or xenon. Other gases which are non-reactive at the temperature of use can be employed so long as the gases have a molecular size which is readily adsorbed by the carbonaceous material 90. The particular gas used is selected by considering the cost and the desired pressure or volume change per degree temperature change, which pressure or volume change increases directly with the molecular weight of the gas; for example, xenon produces a greater pressure or volume change per degree temperature change than krypton.

The adsorbent carbon material 90 is made from granules of a compound containing carbon and a non-carbon component by removing the non-carbon component to leave a carbonaceous skeletal structure having cavities of sufficient size to receive and adsorb substantial quantities of the gas. Preferably, the compound is a synthetic polymer having volatile components, such as hydrogen and a halogen, which can be driven off by heat leaving a carbonaceous skeletal structure which is porous. Suitable synthetic polymers are polyvinylidene chloride or polyvinylidene fluoride. Polyvinylidene chloride or polyvinylidene fluoride are formed into adsorbent carbons by carbonizing or pyrolytic decomposition in a purifying atmosphere, such as a vacuum or a purging flow of inert gas. Carbonizing is performed by heating to a temperature less than the melting point but greater than the temperature at which decomposition can be initially observed. For Saran 113, a copolymer containing about 90% polyvinylidene chloride purchased from DOW Chemical Company, Midland Michigan, carbonizing is performed at a temperature in the range from 138°C (280°F) to 177°C (350°F). The duration of heating required for complete carbonization of the synthetic polymer is dependent upon the size of the granules of the synthetic polymer and the temperature employed. Along with utilizing a predetermined temperature and duration for a certain size of granular synthetic polymer, observation of a reduction in gas being removed by a vacuum system or the gas being evolved from the granular material can be used to determine when the polymer is completely carbonized. During carbonization, the non-carbon components, that is hydrogen and the halogen, are volatilized and removed from the synthetic polymer structure leaving a carbon skeletal structure which is highly porous. After the synthetic polymer is carbonized, the carbonized polymer can be subjected to a higher temperature up to about 1510°C (2750°F) to outgas hydrogen and halogen gases which have been adsorbed. Outgassing can be completed in a short duration, for example 15 minutes.

In manufacture of the flame valve 27 and actuator 24, the granular adsorbent carbon material 90 is placed within the chamber 88 in the bulb 18. The bulb 18, the tubes 22 and 80, the support member 70, the diaphragm 74, the spacer 76, the plunger 48, the spring 84, and the retainer 86 are assembled with the retainer 86 holding the spring 84 against the diaphragm 74 in its range of deflection where the spring 84 has a spring rate less than the spring rate of a linear spring. The assembled actuator 24 is then assembled in the plate 25 which is assembled with the rest of the valve 27. The unsecured end of the tube 80 is open and is connected to an evacuating and gas charging apparatus. The bulb 18 is heated and evacuated to outgas air adsorbed by the carbon material 90. The temperature of the bulb 18 is then adjusted to a predetermined setting-temperature or immersed in a minimum flame at which the valve is to be opened. Then a charge of gas is supplied to the tube 80 until the valve is opened by movement of the plunger 48 and lever 50. At this point the open end of the tube 80 is sealed and the flame valve 27 is completed.

Figure 2:
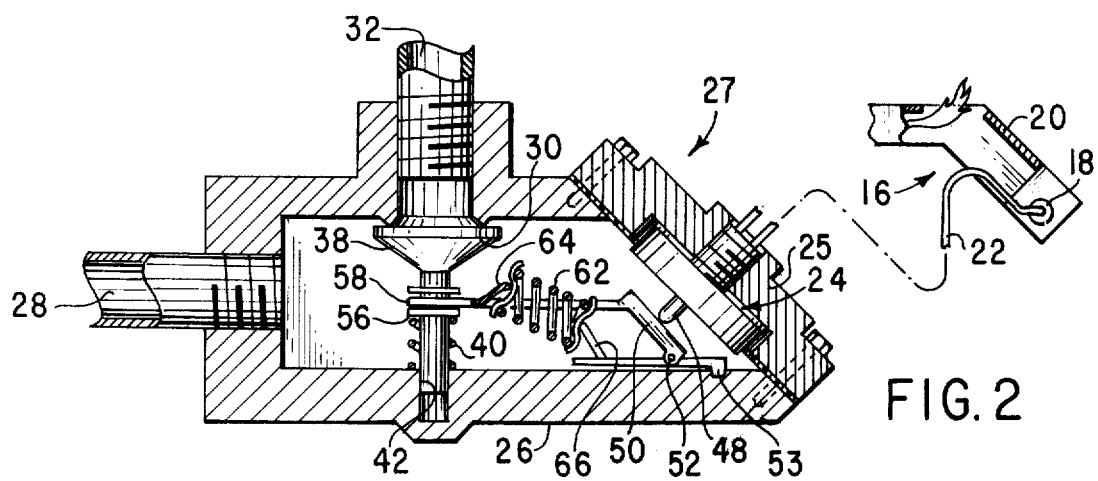
FIG. 2 is a similar view of a portion of the burner system of FIG. 1 illustrating the valve in a closed position.

In operation of the system shown in FIG. 1 the thermostat control device 10, in response to a temperature sensed by the sensor 12, supplies either a low pressure gaseous fuel or a high pressure gaseous fuel to conduit 14 operating the pilot valve 16 to produce a low rate flame as shown in FIG. 2 or a high rate flame as shown in FIG. 1. A portion of the high rate flame is deflected by the deflector 20 against the sensing bulb 18 causing the plunger 48 to advance against the lever 50 pivoting the lever 50 against the force of the spring 62 to engage the flange 56 to lower the valve member 38 against the force of the spring 40. With the valve member 38 lowered, it disengages or opens the valve seat 30 allowing fuel to flow to the main burner 34 where it is ignited by the high rate pilot flame. At the low rate of operation, the flame from the pilot burner 16 extends upwardly and does not impinge upon the flame sensing bulk 18, resulting in the plunger retracting to allow the lever and valve member 38 to move upward under the forces of the springs 62 and 40 to close the valve seat 30 and stop the flow of fuel to the main burner 34.

Referring to FIG. 3, heating the bulb 18 by the deflected portion of the high rate flame heats the carbonaceous material 90 within the bulb 18 and releases adsorbed gas as well as increasing the kinetic energy of non-adsorbed gas producing an increase in the pressure within the chambers 78 and 88 and the tubes 22 and 80 until the force exerted by the diaphragm 74 on the plunger 84 reaches the set range of the spring 84. Further increase in the temperature of the bulb 90 results in release of additional gas from the absorbent material 90 and increased kinetic energy which is transformed into volume change in the chamber 78 and movement of the plunger 48 opening the valve 27 with a positive and rapid motion. Thereafter, further increase in pressure in the chamber 78 produces little additional movement of the plunger 48. Conversely at the termination of the flame impinging upon the bulb 18, the bulb 18 cools causing a decrease in the kinetic energy of the gas as well as adsorption of gas by the gas adsorbent material 90 resulting in a decrease in the pressure in the chamber 88 and 78 and tubes 22 and 80 until the force of the diaphragm on the plunger 48 is less than the bias force of the spring 84 whereupon the plunger 48 retracts with a rapid motion allowing the valve member 38 to close under the force of the springs 40 and 62.

The present flame valve is believed to be an acceptable replacement for existing mercury liquid-vapor operated flame valves. Prior art gas charged flame valves, including those containing activated carbon materials could not produce the rapid opening or closing of a valve in response to initiation or termination of flame impingement; which rapid opening or closing could be accomplished by mercury above or below its vaporization temperature. The unactivated carbonized synthetic polymer 90 has substantially greater volume or pressure change per degree temperature change than activated materials, particularly when employed with one of the heavier noble gases, krypton and xenon; thus making possible the rapid opening and closing of a flame valve by a gas charged actuator.

While the structural distinctions or properties of the carbonized synthetic polymer that cause its' improved pressure or volume change per degree temperature change and hence the improved valve structure can not be visually observed, various theories of the structural properties have been formulated by observation of other properties of the carbonized polymer. Activated carbons, such as activated charcoal, have pores or cavities which are funnel-shaped or cone-shaped; whereas the carbonized synthetic polymer has cavities which are slit-like or have substantial portions with relatively uniform width throughout the depth of such portions. In making activated carbons, the eroding or activation process produces the funnel-shaped cavities; activating or eroding carbonized synthetic polymer with steam or the like will substantially deteriate and eventually destory the improved volume or pressure change per degree temperature change of adsorbed gas in the carbonized synthetic polymer. The slit-like cavities of the carbonized synthetic polymer are believed to result from the production of the cavities by removing or volatilizing the non-carbon components of the polymer while in a solid state.

It is also theorized that the width or diameter of the cavities or pores or their inlets, substantially effects the adsorbent properties of the carbon material. Using a Kelvin method of measuring pore size it has been determined that the pore size of carbonized polyvinylidene chloride ranges from 10 to 15 angstroms in width or diameter, while the diameter of pores in activated charcoal ranges from 15 to 200 angstroms with an average pore size much larger than 17 angstroms. An average cavity or inlet width in the range generally from about 9.2 angstroms to about 17 angstroms and preferably from 12 to 15 angstroms in the carbonized synthetic polymer produces the improved volume or pressure change per degree temperature change. The cavity size of carbonized polymer can be reduced by heating in the range from 1510°C (2750°F) to 2205°C (4000°F). A brief activation with steam, carbon dioxide, or the like can be employed to enlarge the cavities.

Van der Waal's forces are theorized as being the main attractive force resulting in adsorption of gas molecules. The width of the cavities in the carbonized synthetic polymer being slightly larger than two diameters of the monatomic molecules of noble gas results in increased Van der Waal's forces within the cavities due to the closeness of several crystalline faces, carbon lattice structures, or walls in the cavities. Also, the Van der Waal's forces are generally greater for larger molecules which results in the heavier monatomic gases having a greater volume or pressure change per degree of temperature change than the lighter monatomic gases. Since Van der Waals' forces are attributed to weak dipoles, the carbon lattice arrangement produced by the carbonization of a synthetic polymer may have a stronger dipole than other atomic crystalline structures. The apparent Van der Waal's forces, as judged by internal pressure change per degree of temperature change of the carbonized synthetic polymer, are approximately 1.8 times that of activated carbon.

Another structural distinction is found in the number of cavities in a unit weight of the adsorbent carbon material. Carbonized polyvinylidene chloride as measured by a BET method has a surface area of 1200 square meters per gram whereas activated charcoal has a surface area in the range of 500 to 1000 square meters per gram. The surface area is believed to be proportional to the number of pores. The formation of pores or cavities by removing the non-carbon components of a carbonaceous compound leaving a skeletal carbon structure is believed to result in a more porous structure than that formed by eroding or activating cavities in a carbon material.

One advantage of using a noble gas is that the noble gases will maintain their pressure for longer durations of time than more reactive gases. It has been observed there is substantially less diffusion of the noble gases into metal than for more reactive gases; thus the use of a noble gas results in less leakage of gas from the valve actuator 24 and bulb 18 by diffusion through the walls producing a longer lasting and more reliable thermally operated valve.

The utilization of a gas charged carbon adsorbent actuator in a flame valve has the advantage of increased life expectancy over mercury charged actuators. The carbon and gas actuator may be operated at higher temperatures without mercury bulb corrosion as occurs in mercury charged actuators.

Another advantage of using an adsorbent unactivated carbon is the uniformity that can be achieved in manufacturing thermally operated valves. Different batches of carbonized polyvinylidene chloride produced in different process runs have substantially identical adsorption properties, whereas different batches of activated charcoal vary widely in adsorption properties; thus the thermally operated valve employing an unactivated carbonized compound makes possible the practicle manufacture of large quantities of dependable valves which utilize adsorbent carbon and gas.

The utilization of the non-linear spring 84, biased against the pressure of the gas in the chamber 78 and set in a low spring rate range of operation, also contributes to the rapid reliable operation of the valve 27. When the pressure in the chamber 78 produces a force on the plunger 48 within the operational range of the spring 84, a slight change of pressure within the chamber 78 produces a significant change in the position of the plunger 48, thus, a substantial majority of an increase or decrease in the kinetic energy of the gas in the bulb 18 due to a change in temperature is converted into a volume change in the chamber 78 and opening or closing of the valve member 38 rather than into pressure change within the chambers 78 and 88 and tubes 22 and 80.

Additionally, the operational movement of the plunger 48 and the closing and opening of the valve 27 is substantially limited to a preselected operational range of temperatures which is set to sense the impingement of the flame. It is advantageous that this operational range can be set anywhere within a wide range of temperatures which is not possible with the prior art liquid-vapor actuated valves.

With springs having sufficiently negative spring rates, substantially all of the movement of the plunger 48 occurs upon an increase to a selected temperature or upon a decrease to a selected temperature. The difference between the temperature at which the plunger 48 advances and the temperature at which the plunger 48 retracts can be selected by selecting the magnitude of the negative spring rate producing a rapid-acting valve operated by the force from gas pressure in the channer 78.

Since many modifications, changes in detail and variations can be made to the present embodiment, it is intended that all matter in the foregoing description and shown in the drawings be interrupted as illustrative and not in a limiting sense.

We claim:
1. A thermally operated valve comprising
 a valve seat,
 a valve member for closing and opening the valve seat,
 means forming an enclosed chamber,
 an adsorbent carbonaceous material in the chamber,
 a charge of gas in the chamber,
 means responsive to the pressure of the gas in the chamber for moving the valve member relative to the valve seat, and
 said adsorbent carbonaceous material being formed from a synthetic polymer selected from the group consisting of polyvinylidene chloride and polyvinylidene fluoride by removing the hydrogen and halogen components from the synthetic polymer to leave a porous carbonaceous skeletal structure with cavities, and
 said charge of gas including molecules which have a width smaller than the width of the cavities such that the molecules are readily adsorbed and desorbed in the cavities upon decrease and increase, respectively, of temperature.

2. A thermally operated valve as claimed in claim 1 wherein
 the adsorbent carbonaceous material is formed by a process including the steps of subjecting the synthetic polymer to a purifying atmosphere and heating the synthetic polymer while subjected to the purifying atmosphere to a temperature above the decomposition temperature of the synthetic polymer but below the melting temperature of the synthetic polymer to form cavities at sites of volatilized components of sufficient size to receive molecules of the gas.

3. A thermally operated valve as claimed in claim 1 wherein the valve member moving means includes
 a plunger movable in response to gas pressure in the chamber; and
 spring means biasing the plunger against the gas pressure throughout the range of movement of the plunger,
 said spring means having a force differential coefficient which is less than the force differential coefficient of a linear spring throughout the range of movement of the plunger.

4. A thermally operated valve as claimed in claim 1 wherein
 the adsorbent carbonaceous material has cavities with substantially uniform inlets in the skeletal structure of a size large enough to allow entrance and adsorption of monatomic gas in the cavities but small enough to retain substantial quantities of absorbed gas, and
 the charge of gas consists essentially of a monatomic gas.

5. A thermally operated valve comprising
 a housing having an inlet and an outlet with a valve seat interposed between the inlet and the outlet;
 a valve member for closing the valve seat;
 a sensing bulb having a chamber;
 an adsorbent carbonaceous material in the chamber;
 a charge of gas in the chamber;
 means responsive to the pressure of the gas in the chamber for moving the valve member relative to the valve seat;
 said adsorbent carbonaceous material having cavities wherein a substantial majority of the cavities have inlets which have a width in the range of about 9.2 to 17 angstroms;
 said gas charge including gas molecules having widths which are smaller than the widths of the substantial majority of cavities so as to be readily adsorbed and desorbed in the cavities upon decrease and increase, respectively of temperature.

6. A thermally operated valve as claimed in claim 5 wherein
 the average width of the inlets of the cavities in the adsorbent carbonaceous material is within the range of about 12 angstroms to 15 angstroms, and
 the charge of gas is a noble gas selected from helium, neon, argon, krypton and xenon.

7. A thermally operated valve as claimed in claim 5 wherein the charge of gas consists essentially of a monotomic gas.

8. A thermally operated valve comprising
a housing having an inlet and an outlet with a valve seat interposed between the inlet and the outlet;
a valve member for closing the valve seat;
a sensing bulb having a chamber;
an adsorbent carbonaceous material in the chamber;
a charge of gas in the chamber; and
means responsive to gas pressure in the chamber for moving the valve member relative to the valve seat;
said adsorbent carbonaceous material being porous with cavities wherein a substantial majority of the cavities have substantially uniform widths in the range of about 9.2 to 17 angstroms throughout portions of the depths of the cavities; and
said charge of gas including gas molecules having widths which are smaller than the widths of the substantial majority of cavities so as to be readily adsorbed and desorbed in the cavities upon decrease and increase, respectively, of temperature.

9. A thermally operated valve as claimed in claim 8 wherein the charge of gas consists essentially of a monatomic gas.

10. A thermally operated valve as claimed in claim 8 wherein the cavities have depths which are substantially greater than their widths.

11. A thermally operated valve as claimed in claim 8 wherein the average width of the cavities in the carbonaceous material is in the range of 12 to 15 angstroms.

12. A thermally operated valve as claimed in claim 11 wherein the charge of gas is selected from the group consisting of helium, neon, argon, krypton and xenon.

13. A thermally operated valve comprising
a housing having an inlet and an outlet with a valve seat interposed between the inlet and the outlet;
a valve member for closing the valve seat;
a sensing bulb having a chamber;
porous carbonaceous granules in the bulb, formed by substantially complete pyrolytic decomposition of synthetic polymer granules containing polyvinylidene chloride in a purifying atmosphere at a temperature in the range of 138°C to 177°C;
a charge of gas in the chamber, selected from the group consisting of helium, neon, argon, krypton and xenon; and
expandable and retractable means responsive to the gas pressure in the chamber for moving the valve member relative to the valve seat.

14. A thermally operated valve as claimed in claim 13 wherein the expandable and retractable means includes
a support member having a flat face,
a diaphragm secured to the flat face,
a plunger having a shoulder portion,
a nearly flat frusto-conical spring with the shoulder portion engaging the inner periphery of the spring, and
means on the support member for holding the outer periphery of the spring to bias the plunger against the diaphragm.

15. A thermally operated valve as claimed in claim 14 wherein there is included,
a spring biasing the valve member toward the valve seat,
a lever pivoted at one end in the housing and having means engaging the valve member at the other end of the lever,
said plunger engaging the lever at a point intermediate the one and other ends such as to open the valve member when the plunger is advanced by an increase in gas pressure in the chamber.

16. A flame responsive valve comprising
a valve seat,
a flame sensing bulb positioned in the path of a flame,
gas pressure responsive means for moving the valve member relative to the valve seat,
a tube connecting the pressure responsive means to the flame sensing bulb,
a quantity of granular adsorbent material in the flame sensing bulb,
said adsorbent material formed by pyrolytic decomposition of polyvinylidene chloride to form a porous carbonaceous structure with cavities of sufficient size to receive and adsorb monatomic molecules of gas,
a charge of gas in the flame sensing bulb, tube and gas pressure responsive means, said charge of gas being selected from krypton and xenon.

* * * * *